US00RE37699E

(19) United States
(12) Reissued Patent
Bradfute et al.

(10) Patent Number: US RE37,699 E
(45) Date of Reissued Patent: May 14, 2002

(54) FILM CONTAINING ALPHA-OLEFIN/VINYL AROMATIC COPOLYMER

(75) Inventors: John G. Bradfute, Greenville; Blaine Clemons Childress, Inman; Marvin Havens, Greer; Cedric Michael Lulham, Gray Court; Ronald D. Moffitt, Duncan; Martindale Nelson, Greer; Lawrence R. Norpoth; William Peyton Roberts, both of Simpsonville; Gloria Garcia Toney, Greer; George Dean Wofford, Duncan, all of SC (US)

(73) Assignee: Cryovac, Inc., Duncan, SC (US)

(21) Appl. No.: 09/357,531

(22) Filed: Jul. 19, 1999

Related U.S. Patent Documents

Reissue of:
(64) Patent No.: 5,658,625
Issued: Aug. 19, 1997
Appl. No.: 08/248,799
Filed: May 29, 1994

(51) Int. Cl.[7] ..... B65B 53/00; B32B 27/08
(52) U.S. Cl. ..... 428/34.9; 428/35.2; 428/35.4; 428/36.6; 428/36.7; 428/474.4; 428/476.3; 428/349; 428/516; 428/518; 428/520
(58) Field of Search ..... 428/516, 518, 428/520, 348, 34.9, 35.2, 35.4, 36.4, 36.6, 36.7, 474.4, 476.3

(56) References Cited

U.S. PATENT DOCUMENTS 4,076,698 A 2/1978 Anderson et al. ..... 526/348.6

(List continued on next page.)

FOREIGN PATENT DOCUMENTS

| | | | |
|---|---|---|---|
| EP | 0 360 385 | | 7/1989 |
| EP | 0 337 316 | | 10/1989 |
| EP | 0 363 895 | | 10/1989 |
| EP | 0 390 442 | | 3/1990 |
| EP | 0 502 330 | | 2/1991 |
| EP | 0416815 | * | 3/1991 |
| EP | 0 481 081 | | 4/1992 |
| EP | 0 570 931 | | 11/1993 |
| EP | 0 572 990 | | 12/1993 |
| EP | 0 597 502 A2 | | 5/1994 |
| EP | 0 600 425 A1 | | 6/1994 |
| WO | WO 90/03414 | * | 4/1990 |
| WO | WO 93/03093 | * | 2/1993 |
| WO | WO 93/12151 | * | 6/1993 |
| WO | WO 93/23412 | | 11/1993 |
| WO | WO 94/00500 | * | 1/1994 |
| WO | WO 94/07954 | * | 4/1994 |
| WO | WO 94/09060 | | 4/1994 |

OTHER PUBLICATIONS

Determination of . . . J. of Polymer Sci. vol. 20, 441–455, 1982.*

(List continued on next page.)

*Primary Examiner*—Leszek Kiliman
(74) *Attorney, Agent, or Firm*—Rupert B. Hurley, Jr.

(57) ABSTRACT

Film and sheet materials, and articles made therefrom, such as bags, pouches, trays, etc., comprise one or more layers of a thermoplastic, homogeneous alpha-olefin/vinyl aromatic copolymer, preferably an ethylene/styrene copolymer. The alpha-olefin/vinyl aromatic copolymer has properties which can can provide a desired performance characteristics such as impact resistance, printability, RF sealability, free shrink, optics, as well as many others. The homogeneous alpha-olefin-vinyl aromatic copolymer may be present in a monolayer film, either alone or in a blend, or may be included in one or more layers of a multilayer film. Also included is a multilayer thermoformable article comprising a web having a film of such alpha-olefin/vinyl aromatic copolymers thereto. Finally, also included is an RF-sealable film comprising such copolymers.

73 Claims, 1 Drawing Sheet

U.S. PATENT DOCUMENTS

| | | | | | |
|---|---|---|---|---|---|
| 4,302,565 | A | * | 11/1981 | Goeke et al. | 526/88 |
| 4,302,566 | A | * | 11/1981 | Karol et al. | 526/124.6 |
| 4,847,148 | A | * | 7/1989 | Schirmer | 428/332 |
| 5,118,561 | A | * | 6/1992 | Gusavage et al. | 428/394.4 |
| 5,128,196 | A | * | 7/1992 | Luetkens et al. | 428/213 |
| 5,206,075 | A | * | 4/1993 | Hodgson et al. | 428/216 |
| 5,241,031 | A | * | 8/1993 | Mehta | 526/348.1 |
| 5,272,236 | A | * | 12/1993 | Lai et al. | 526/348.5 |
| 5,278,272 | A | * | 1/1994 | Lai et al. | 526/348.5 |
| 5,369,136 | A | * | 11/1994 | Park et al. | 521/143 |
| 5,369,137 | A | * | 11/1994 | Paquet et al. | 521/146 |
| 5,427,807 | A | | 6/1995 | Chum et al. | 426/393 |
| 5,562,958 | A | | 10/1996 | Walton et al. | 428/34.9 |
| 5,604,043 | A | | 2/1997 | Ahlgren | 428/518 |
| 5,703,187 | A | | 12/1997 | Timmers | 526/282 |

OTHER PUBLICATIONS

Exxon Cites Breakthrough, Modern Plastics pp. 46–49, Oct. 1992.*

Polyolefins Gain Higher . . . Modern Plastics pp. 46–49, Oct. 1991.*

Enter a New Generation . . . Plastics technology pp. 15–19, Nov. 1991.*

Technology News Plastic Technology p. 25, Nov. 1992.*

Copolymer of Ethylene, Polymer Bulletin 20 p. 237, 1988.*

Exxon cites Breakthrough Modern Plastics pp. 61–62, Jul. 1991.*

Horton, A.D., "Metallocence Catalysis: Polymers by Design?", Trends in Polymer Science ("TRIP"), vol. 2, No. 5, pp. 158–166 (May 1994).

* cited by examiner

FILM CONTAINING ALPHA-OLEFIN/VINYL AROMATIC COPOLYMER

Matter enclosed in heavy brackets [ ] appears in the original patent but forms no part of this reissue specification; matter printed in italics indicates the additions made by reissue.

FIELD OF THE INVENTION

The present invention relates to films comprising olefin/vinyl aromatic copolymer. The present invention relates especially to multilayer films containing ethylene/styrene copolymer.

BACKGROUND OF THE INVENTION

The copolymerization of ethylene and styrene by a conventional Ziegler-Natta catalyst is reported in Polymer Bulletin, 20, p. 237 (1988). Ziegler-Natta catalytic methods are commonly used throughout the polymer industry, especially for the production of ethylene copolymers, and have a long history tracing back to about 1957. However, for an vinyl aromatic comonomer such as styrene the polymerization activity for such Ziegler-Natta catalysts is low, such that an ethylene/styrene copolymer has a maximum of only about 1 mole percent styrene units in the copolymer. Furthermore, because of the heterogeneity of conventional Ziegler-Natta catalysts, the reported copolymer is actually a mixture of polymer chains of varying length, some having more than 1% by mole of styrene per individual chain and many, if not most, having no styrene groups.

Conventional Ziegler-Natta catalysts are actually composed of many types of catalytic species, each at different metal oxidation states and different coordination environments with ligands. Examples of such heterogeneous systems include metal halides activated by an organometallic co-catalyst such as, for example, titanium or magnesium chlorides complexed to trialkyl aluminum. Because these systems contain more than one catalytic species, they possess polymerization sites with different activities and varying abilities to incorporate comonomer into a polymer chain. The result of such multi-site chemistry is a product with poor control of the polymer chain architecture both within the sequence of a single chain, as well as when compared to a neighboring chain. In addition, differences in catalyst efficiency produce polymers of high molecular weight at some sites and low molecular weight at others.

Recently, a new catalyst technology useful in the polymerization of polyolefins has been introduced. Examples of introductory articles include "Exxon Cites 'Breakthrough' in Olefins Polymerization," Modern Plastics, p.61, (July 1991); "Polyolefins Gain Higher Performance from New Catalyst Technologies," Modern Plastics p.46, (October 1991); "PW Technology Watch," Plastics World, p.29, (November 1991); and Plastics Technology, p.15, (November 1991). These polymerization systems are based on the chemistry of metallocenes, which are organometallic compounds which contain one or more cyclopentadienyl ligands attached to metals such as hafnium, titanium, vanadium, or zinconium. A co-catalyst, such as, but not limited to, oligomeric methyl alumoxane, is often used to promote the catalytic activity of the system. By varying the metal component and the cyclopentadienyl ligand, a diversity of polymer products may be tailored having molecular weights ranging from about 200 to greater than 1,000,000 and molecular weight distributions from 1.5 to about 15. The choice of co-catalyst influences the efficiency and thus the production rate, yield and cost.

The uniqueness of metallocene catalysts resides in the steric and electronic equivalence of each catalyst position. Specifically, metallocenes are characterized as having a single, stable chemical type rather than a volatile mixture of states as discussed above for conventional Ziegler-Natta catalysts. This results in a system composed of catalyst positions which have a singular activity and selectivity. For this reason, metallocene catalyst systems are often referred to as "single site" owing to their homogeneous nature. Polymers and copolymers produced by such systems are often referred to as single site resins by their suppliers.

In recent years several resin suppliers have been researching and developing metallocene catalyst technology, with the polymers produced thereby having a narrow molecular weight distributions.

Olefin/vinyl aromatic copolymers have been prepared using metallocene catalysts. These polymers have only up to 50 mole percent of the aromatic vinyl polymerization units, because the active site of the catalyst becomes crowded with the incorporation. of the sterically hindered aromatic vinyl comonomer, making it unlikely, or impossible, that another hindered comonomer could enter into the polymerization as the next monomer in the sequence.

These olefin/vinyl aromatic copolymers are similar in at lest some properties to other homogeneous, single site catalyzed copolymers such as the homogeneous, single site catalyzed ethylene alpha-olefins. That is, the present copolymers are characterized as having a narrow molecular weight distribution (MWD) and a narrow compositional distribution (CD). MWD refers to the breadth of the distribution of molecular weights of the polymer chains, and is a value which is obtained by dividing the number average molecular weight into the weight average molecular weight. The low CD, or regularity of side branch chains along a single chain and its parity in the distribution and length of all other chains, great reduces the low molecular weight and high molecular "tails". These features reduce extractables which arise from poor molecular weight control as well as improve optics by avoiding the formation of linear, ethylene-rich fractions.

However, at least in part because of the polarity of the vinyl aromatic comonomers used in the present invention, the present copolymers do not always follow the simplified trends of homogeneous, single site catalyzed ethylene alpha-olefins. Of course, it is the unique attributes of the present copolymers which make them desirable for use in a variety of film structures in accordance with the present invention. Yet, at least for those ethylene styrene copolymers which have a relatively low styrene content, generally from about 1% to about 10% by mole of styrene, processing and some physical properties are analogous to those of the homogeneous, single site catalyzed ethylene alpha-olefins. However, percent crystallinity drops much faster for the present copolymers than with any of the linear olefin comonomers of the homogeneous ethylene alpha-olefins. For the present copolymers 0% crystallinity occurs somewhere between 10% and 20% by mole of styrene. Thus, at least for those ethylene/styrene copolymers having between about 10% and 25% by mole of styrene, processing and some physical properties are analogous to known elastomers including the elastomeric homogeneous ethylene alpha-olefins. Yet, once again, a much greater percent by mole of alpha-olefin is required for homogeneous ethylene alpha-olefins to become elastomeric. Beyond 25% by mole of styrene such analogies to homogeneous ethylene alpha-olefins become less appropriate as the copolymer becomes more like polystyrene. Crystallinity generally remains at or about 0%; but, the glass transition temperature rises with an increase in amount of styrene sequences resulting in an increase in stiffness in resultant end products. However, the chemistry of the vinyl aromatic comonomer, whether it be styrene or a substituted styrene, is such that the present copolymers in each of the three comonomer content regions are beneficial when used in the production of appropriate film structure.

SUMMARY OF THE INVENTION

It has been discovered that olefin/vinyl aromatic copolymers provide stiffer amorphous regions, and therefore can be used to produce films having a high level of toughness, i.e., more resistant to puncture than, for example, ethylene/alpha-olefin copolymers. The stiffer amorphous regions provide advantages in films as applied force is dispersed more evenly, another reason films from such copolymers are tougher.

In the packaging arts, this result can be beneficial, for example, in that it could reduce or eliminate the need to use patch bags for the packaging of bone-in meat products.

Furthermore, the glass transition temperature ("$T_g$") of olefin/vinyl aromatic copolymers can be above room temperature, which means that these copolymers can be used to make films having improved lock-in of orientation at room temperature.

The chemical characteristics of olefin/vinyl aromatic copolymers, at the polymer level, provides a very large pendant group, These large pendant groups are effective in reducing the crystallinity of the polyethylene, because such large side groups cause very large crystalline defects. Olefin/vinyl aromatic copolymers can be used to make films-that are elastomeric in character, similar to other low crystallinity polyethylene. The olefin/vinyl aromatic copolymer have reduced molecular mobility resulting from the size of the aromatic pendant, the rigidity of the aromatic pendant, and the increased hydrogen bonding resulting from the unsaturation of the aromatic pendant. These attributes can be used to make a film having desirable stretch characteristics (i.e., low energy to stretch and a reduced tendency to yield, particularly when non-oriented). Such films are especially useful for in-store, central, and medical packaging films, where polyvinyl chloride films are currently used. Furthermore, the aromatic component can be utilized to make films exhibiting an improved level of crosslinking, as a result of the increased level of unsaturation in the aromatic component.

Furthermore, olefin/vinyl aromatic copolymers can be used to make films having good clarity, in combination with the high level of stiffness due to the aromatic component in the polymer, and the flexibility of the ethylene component in the polymer.

The chemical characteristics of olefin/vinyl aromatic copolymers, at the polymer level, can provide films comprising these copolymers with one or more of a wide variety of advantages. Olefin/vinyl aromatic copolymers have a relatively high void volume, which is related to the disruptive crystallinity, which can be used to make a film which is highly permeable with respect to gases, such as gaseous oxygen. Furthermore, the electronic structure of aromatic entities, such as styrene, can be used to permit "solution diffusion" of polar gases, such as gaseous oxygen, carbon dioxide, water vapor, etc., through a film containing such a composition. Such highly permeable films are useful in modified atmosphere packaging, especially dual-web packaging where an oxygen-impermeable film can be peeled off of the package in order to expose a gaseous-oxygen permeable package, so that meat in the package will bloom from exposure to gaseous oxygen passing through the film which is permeable to gaseous oxygen.

The high void volume in olefin/vinyl aromatic copolymers can also be used to provide films comprising these copolymers with the characteristic of increased stretch.

Furthermore, the high void volume of such copolymer, when used in films, can be used to make films having an increased capacity for absorption of relatively low molecular weight additives, such as antifog additives, antiblock additives, and antislip additives. Furthermore, the voids can be used to make films having the characteristic of taking up and retaining flavor additives, color additives, printing inks, etc., which can result in less contamination into the product within the package, or from one product to another. The property of differential absorption, when used to make printed films subjected to uv curing, can be used to result in a film effective to capture ultraviolet light in a film layer to be used as an activator used in the curing of the ink.

The high absorption characteristic can also be used to merely temporarily hold flavors, colors, etc., for films used in the packaging of a product wherein the flavor, color, etc., is thereafter transferred to the product, such as a cook-in turkey breast, etc.

The variety of mechanical and thermal transitions in olefin/vinyl aromatic copolymers can also provides films containing such copolymers with the characteristics having a broadened range of softening and DSC "melting", which can be used to provide films with improved heat sealing characteristics. The wider variety of mechanical and thermal transitions in these copolymers can be further extended by blending such copolymers with additional polymers. Furthermore, because olefin/vinyl aromatic polymers have such a broad range of crystallization (the reverse of melting), these copolymers can interact with a broad range of other resins, and therefore are especially useful as tie layers in multilayer films, and can be used to reduce the net crystallization of mixtures of such resins. Furthermore, the resulting percentage increase in amorphous regions when used in a film, can be used to increase film properties such as shrink, tensile strength, elongation, and other related film characteristics.

The use of olefin/vinyl aromatic copolymers in films, both monolayer films as well as multilayer films, can provide one or more of a wide variety of improved properties to the film, and can be advantageous in certain end uses. For example, a film of improved printability can be prepared using monomers having the polarity of olefin/vinyl aromatic copolymers. Olefin/vinyl aromatic copolymers can be used: to provide a machinable film having a high gas transmission rate (especially advantageous in case-ready packaging in which a tray has a permeable layer overlaid with an oxygen barrier layer), with regard to both oxygen transmission rate as well as moisture transmission rate; to prepare films having a relatively low sealing temperature; to prepare films having improved optics through higher gloss and/or lower haze than is achieved from conventional alpha-olefin copolymers; in tie layers of multilayer films, to provide improved and diverse compatibility characteristics; to prepare films having improved resistance to tear propagation; to prepare films having improved sealability, in terms of improved hot tack, improved seal strength, and/or seal initiation temperature; to prepare films having improved impact strength; to prepare films having improved thermoforming characteristics, such as deep draw characteristics; to provide films having improved organoleptic characteristics; to provide films having a lower level of extractables; to provide films having improved elastic recovery; to provide films having improved low-shrink characteristics; to provide films having improved wettability; to provide films having improved slip properties; to provide films having improved modulus; to provide films having improved stiffness; to provide films having improved softness; to provide films which are RF sealable; to provide films having improved stretch memory, high free shrink, greater toughness; to films having enhanced sealability after irradiation; to films having a desired glass transition temperature; to films having a selected Vicat Softening Point as a function of styrene content.

Olefin/vinyl aromatic copolymers can also be used in the preparation of foams, especially foam sheet, having improved thermoforming characteristics, especially in having improved resistance to cracking. The olefin/vinyl aromatic copolymer can be used to provide a polystyrene barrier tray, such as a barrier foam tray, with improved delamination resistance and structural integrity.

Olefin/vinyl aromatic copolymers can also be used to provide an improved patch for use on bag used in the packaging of bone-in meats.

As a first aspect, the present invention is directed to a film comprising a copolymer from a copolymerization of an alpha-olefin comonomer and a vinyl aromatic comonomer, wherein the alpha olefin comonomer comprises at least one member selected from the group consisting of $C_2$ alpha-olefin, $C_3$ alpha-olefin, $C_4$ alpha-olefin, $C_5$ alpha-olefin, $C_6$ alpha-olefin, $C_7$ alpha-olefin and $C_8$ alpha-olefin, wherein the copolymer comprises alpha-olefin polymerization units in an amount of at least 50 mole percent.

Preferably, the alpha-olefin monomer comprises at least one member selected from the group consisting of ethylene and propylene. Preferably, the vinyl aromatic copolymer comprises styrene; more preferably, styrene.

At a second aspect, the present invention is directed to a film comprising composition comprising a thermoplastic, homogeneous alpha-olefin/vinyl aromatic copolymer. The homogeneous alpha-olefin/vinyl aromatic copolymer comprises recurring units of the formula:

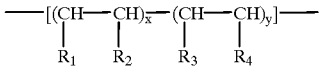

In the formula, $x \geqq y$, i.e., there must be a mole fraction of polymerization units derived from the alpha-olefin monomer (a mole fraction represented by "x", as determined by $x/(x+y)X\ 100$) which is at least as great as the mole fraction of the polymerization units derived from the aromatic monomer (a mole fraction represented by "y", as determined by $y/(x+y)X\ 100$). $R_1$ is a member selected from the group consisting of hydrogen, $C_1$ alkyl, $C_2$ alkyl, $C_3$ alkyl, $C_4$ alkyl, $C_5$ alkyl, $C_6$ alkyl, and mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, and mixtures thereof; provided that $R_1$ and $R_2$ cannot both be alkyl. $R_3$ is a member selected from the group consisting of hydrogen, aromatic, and mixtures thereof; $R_4$ is a member selected from the group consisting of hydrogen, aromatic, and mixtures thereof; provided that one member, and only one member, selected from the group consisting of $R_3$ and $R_4$, is aromatic. Furthermore, a copolymer portion betweenn every two adjacent members selected from the group consisting of aromatic $CHR_3$ and aromatic $CHR_4$ comprises at least two $—CH_2—$ units.

As a third aspect, the present invention is directed to a multilayer film comprising a first outer layer comprising polypropylene, a second outer layer comprising polypropylene, and an inner layer between the first outer layer and the second outer layer. The inner layer comprises a thermoplastic homogeneous alpha-olefin/vinyl aromatic copolymer as described immediately above in the first and second aspects of the present invention.

As a fourth aspect, the present invention is directed to a multilayer film comprising a first layer, a second layer, a third layer, and a fourth layer. The first layer is an outer layer, and serves as a heat sealing layer. The second layer is an inner (i.e., core) layer, and comprises the thermoplastic homogeneous alpha-olefin/vinyl aromatic copolymer as set forth above according to the first and second aspects of the present invention. The third layer is an inner layer and serves as a barrier to gaseous oxygen. The fourth layer is an outer layer.

As a fifth aspect, the present invention is directed to a multilayer film comprising a first layer and a second layer. The first layer serves as a barrier layer. The second layer serves as a heat sealing layer. The second layer comprises the thermoplastic homogeneous alpha-olefin/vinyl aromatic copolymer as set forth above in the first and second aspects of the present invention.

As a sixth aspect, the present invention is directed to a multilayer film comprising a first layer, a second layer, and a third layer. The first layer is an outer layer and comprises the thermoplastic homogeneous alpha-olefin/vinyl aromatic copolymer as set forth above in the first and second aspects of the present invention. The second layer is an inner layer. The third layer is an outer layer, and comprises a second thermoplastic homogeneous alpha-olefin/vinyl aromatic copolymer, which is a member of the group of homogeneous alpha-olefin/vinyl aromatic copolymers s set forth above in the first and second aspects of the present invention.

As a seventh aspect, the present invention is directed to a multilayer thermoformable article, comprising a first layer and a second layer. The first layer comprises a polystyrene web. The second layer comprises a multilayer, heat-resistant film, which, in turn, comprises the thermoplastic, homogeneous alpha-olefin/vinyl aromatic copolymer as set forth in the first and second aspects of the present invention.

As an eighth aspect, the present invention is directed to an RF sealable thermoplastic olefin-based film comprising thermoplastic, homogeneous alpha-olefin/vinyl aromatic copolymer comprising styrene polymerization units in an amount of from about 25 to 40 mole percent.

As a ninth aspect, the present invention is directed to a multilayer article comprising a heat-shrinkable patch member on a thermoplastic bag. The heat-shrinkable patch member comprises the thermoplastic homogeneous alpha-olefin/vinyl aromatic copolymer as set forth above in the first and second aspects of the present invention.

DETAILED DESCRIPTION OF THE INVENTION

Figure 1:
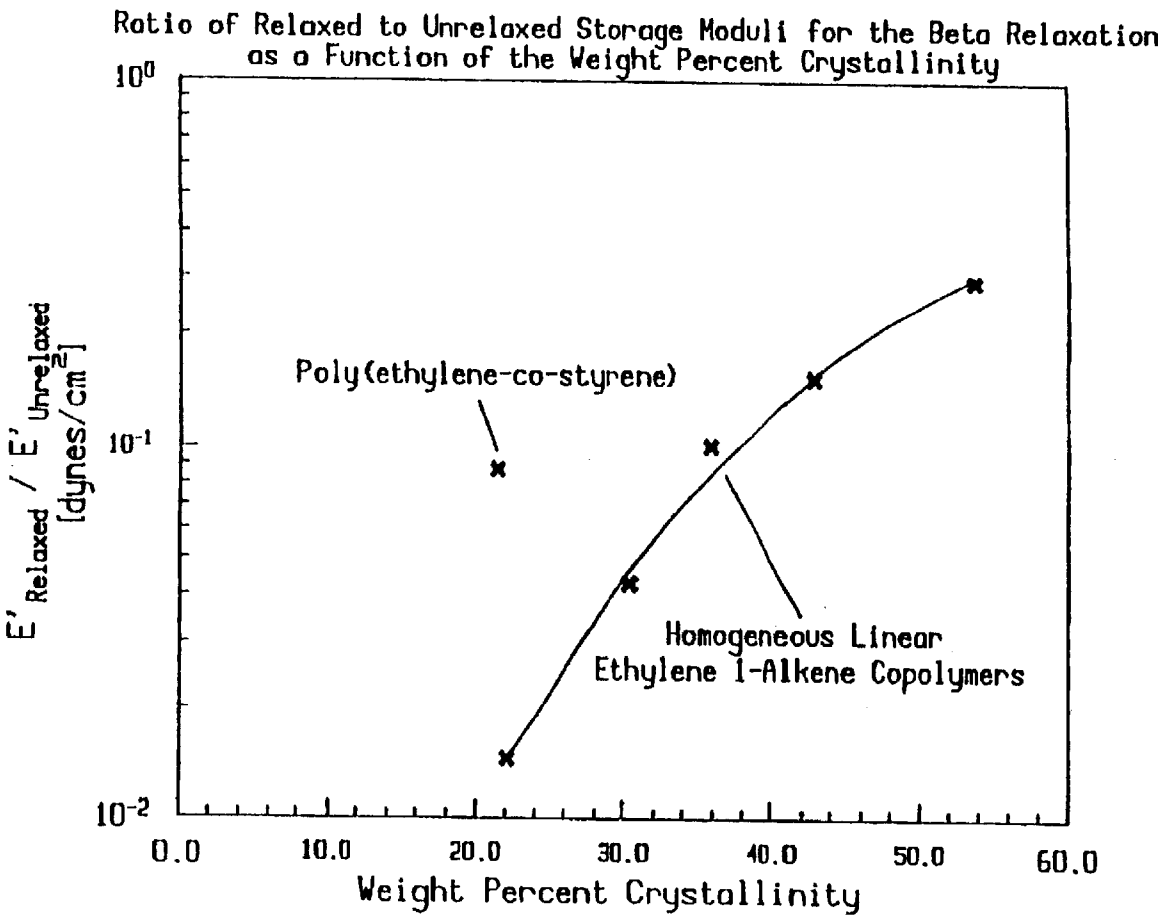
FIG. 1 is a plot of data points and curves derived therefrom, for various polymers, the plot being of: (a) a ratio of relaxed to unrelaxed storage moduli for the beta relaxation, versus (b) weight percent crystallinity.

As used herein, the term "sealed" refers to any and all means of closing a package, such as heat sealing via hot air and/or heated bar, ultrasonic sealing, and even the use of clips on, for example, a shirred casing, etc.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, are used with reference to the ability of a monolayer film or a multilayer film to serve as a barrier to one or more gases. Oxygen barrier layers can comprise, for example, polymerized ethylene vinyl alcohol, polyvinyl chloride, polyvinylidene chloride, polyamide, polyester, polyacrylonitrile, etc., as known to those of skill in the art. Preferably, the oxygen barrier layer comprises polymerized ethylene vinyl alcohol, polyvinyl chloride, polyvinylidene chloride, and polyamide, as known to those of skill in the art.

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer having a modulus of at least $10^7$ Pascals, at room temperature.

As used herein, "oxygen transmission rate", also referred to as "OTR" and "oxygen permeability", is measured according to ASTM D 3985, a test known to those of skill in the film art.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimension. Upon subsequently heating unrestrained, unannealed, oriented polymer-containing material to its orientation temperature, heat shrinkage is produced almost to the original unstretched, i.e., pre-oriented dimensions.

More particularly, the term "oriented", as used herein, refers to oriented films, wherein the orientation can be produced in one or more of a variety of manners. Many of the thermoplastic films of the present invention are heat-shrinkable. The term "oriented" is used herein interchangeably with the term "heat-shrinkable" with each of these terms designating a material which has been stretched and set by cooling while substantially retaining its stretched dimensions. An oriented material will tend to return to its original unstretched (unextended) dimensions when heated to an appropriate elevated temperature. The stretching to orient may be accomplished in many ways such as, for example, by "blown bubble" techniques or "tenter framing." These processes are well known to those skilled in the art and refer to orientation procedures whereby the material is heated to its softening temperature and then stretched in the cross of transverse direction (TD) and/or in the longitudinal or machine direction (MD). After being heated and stretched, the film is quickly quenched while substantially retaining its stretched dimensions to cool the film rapidly and thus set or lock in the oriented molecular configuration.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an α-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable catalytic polymerization process, including solution polymerization, slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product, It is also important that the polymerization pressure be above about 500 bar (kg/$cm^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerizes in a higher weight percent than the second listed monomer, and, for copolymers which are terpolymers, quadripolymers, etc.,preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/α-olefin copolymer"), identifies the comonomers which are copolymerized to produce the copolymer. Such phrases as "ethylene α-olefin copolymer" is the respective equivalent of "ethylene/α-olefin copolymer."

As used herein, the phrase "heterogeneous polymer" refers to polymerization reaction products of relatively wise variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et al., and U.S. Pat. No. 4,302,566, to KAROL, et al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et al., J. Poly. Sci. Poly. Phys. Ed., Vol. 20, p.441 (1982). Preferably, the homogeneous copolymers have a CDBI greater than about 70%, i.e., a CDBI of from about 70% to 99%. In general, the homogeneous copolymers in the multilayer films of the present invention also exhibit a relatively narrow melting point range, in comparison with a "heterogeneous copolymers", i.e., polymers having a CDBI of less than 55%. Preferably, the homogeneous copolymers exhibit an essentially singular melting point characteristic, with a peak melting point ($T_m$), as determined by Differential Scanning Colorimetry (DSC), of from about 60° C., to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/α-olefin copolymer can, in general, be prepared by the copolymerization of ethylene and any one or more α-olefin. Preferably, the α-olefin is a $c_3$–$C_{20}$ α-monoolefin, more preferably, a $C_4$–$C_{12}$ α-monoolefin, still more preferably, a $C_4$–$C_8$ α-monoolefin. Still more preferably, the α-olefin comprises at least one member selected from the group consisting of butene-1, hexene-1, and octene-1, i.e., 1-butene, 1-hexene, and 1-octene, respectively. Most preferably, the α-olefin comprises octene-1, and/or a blend of hexane-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one genus of homogeneous ethylene/α-olefin, copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO/90/30414, in the name of Exxon Chemical Patents, Inc., all four of which are hereby incorporated in their entireties, by reference there. Still another genus of homogeneous ethylene/α-olefin copolymers is disclosed in U.S. Pat. No. 5,272,236, to LAI, et al., and U.S. Pat. No. 5,278,272, to LAI, et al., both of which are hereby incorporated in their entireties, by reference thereto.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the phrase "vinyl aromatic", with respect to monomers, refers to styrene, vinylnaphthalene, and vinylanthracene, with or without one or more substituents (for hydrogens) present on the aromatic ring(s), and/or the olefin carbon connected to the aromatic ring. Furthermore, this phrase is used herein with reference to polymerization units of the above monomers. Preferably, the vinyl aromatic monomer is styrene.

As used herein, the phrase "alpha-olefin", and the phrase "alpha-olefin monomer", refer to olefinic compounds, whether unsubstituted or substituted, in which the first two carbon atoms in the chain have a double bond therebetween. Furthermore, as used herein, both of these phrases are inclusive of ethylene and propylene.

As used herein, the phrase "polymerization unit" refers to a unit of a polymer derived from a monomer used in the polymerization reaction. For example, the phrase "alpha-olefin polymerization units" refers to a unit in, for example, an alpha-olefin/vinyl aromatic copolymer, the polymerization unit being that residue which is derived from the alpha-olefin monomer after it reacts to become a component of the polymer chain.

As used herein, the phrase "vinyl aromatic polymerization unit" refers to a corresponding polymerization unit of the polymer from the polymerization, which is the residue derived from the vinyl aromatic monomer after it reacts to become a component of the polymer chain.

As used herein, copolymers, terpolymers, etc. are named in terms of the monomers from which they are produced. For example, an "ethylene/alpha-olefin copolymer" is a copolymer comprising polymerization units derived from the copolymerization of ethylene monomer and alpha-olefin monomer, with or without additional comonomer(s). Likewise, an alpha-olefin/vinyl aromatic copolymer is a copolymer comprising polymerization units derived from the copolymerization of alpha-olefin monomer with vinyl aromatic comonomer, with or without additional comonomer(s).

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/α-olefin copolymers, ethylene/α-olefin copolymers, butene/α-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copoymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fuamric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the term "polypropylene" refers to any polymer comprising propylene polymerization units, regardless of whether the polymer is a homopolymer or a copolymer, and further includes blends of such homopolymers and copolymers. The phrase "propylene polymerization units", as used herein, refers to polymerization units in a polymer chain, the repeating units being derived from the polymerization of unsubstituted propylene monomer and/or substituted propylene polymer, the double bond being opened in the polymerization reaction.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene/alpha-olefin copolymer", and "ethylene/α-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e, 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/α-olefin copolymers, such as the long chain branched homogeneous ethylene/α-olefin copolymers available from the Dow Chemical Company, known as AFFINITY (TM) resins, are also included as another type of alpha-olefin copolymer useful in the present invention.

In general, the ethylene/α-olefin copolymer comprises a copolymer resulting from the copolymerization of from about 80 to 99 weight percent ethylene and from 1 to 20 weight percent α-olefin. Preferably, the ethylene α-olefin copolymer comprises a copolymer resulting from the copolymerization of from about 85 to 95 weight percent ethylene and from 5 to 15 weight percent α-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "outside layer" refers to the outer layer, of a multilayer film packaging a product, which is closest to the product, relative to the other layers of the multilayer film.

As used herein the phrase "outside layer"p refers to the outer layer, of a multilayer packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films refer to any inner (i.e., internal) film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein the phrases "seal layer", "sealing layer", "heat sealing layer" and "sealant layer", refers to an outer film layer, or layers, involved in the sealing of the film to itself or the other outer layer of the same film, or an outer layer of another film, or article. It should also be recognized that in general, up to the outer 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a good contact layer in the packaging of foods. In general, a heat sealing layer comprises any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably thermoplastic polyolefin having less than 60 weight percent crystallinity.

As used herein, the phrase "tie layer" refers to any inner layer having the primary purpose of adhering two layers to one another. In general, suitable polymers for use in tie layer include polymers having polar functional groups.

As used herein, the phrase "skin layer" refers to an outer layer of a multilayer film used in a package containing a product, wherein the film is used to make the package so that the outer layer is an outside layer with respect to the package. Such outside outer film layers are subject to abuse during storage and handling of the packaged products.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrustion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

The thermoplastic, homogeneous alpha-olefin/vinyl styrene copolymers to be used in the films of the present invention are described, in general and with respect to many specifics including the structure of the thermoplastic copolymer and methods for preparation of the thermoplastic copolymer, in: (1) EP 0 416 815 A2, to STEVENS, et. al., in the name of The Dow Chemical Company; (2) WO 94/00500, to R. B. PANNELL, et al., in the name of Exxon Chemical Patents, Inc., and (3) Plastics Technology, p. 25 (September 1992), each of which is hereby incorporated by reference thereto, in its entirety.

FIG. 1 is a plot of a ratio of relaxed to unrelaxed storage moduli for the beta relation of the polymer, versus weight percent crystallinity, this plot providing data for both homogeneous ethylene/alpha-olefin copolymers, as well as a particular homogeneous, thermoplastic, olefin/vinyl aromatic copolymer. As can be seen in FIG. 1, the ratio of the moduli (i.e., similar to the Young's Modulus, which is a measure of the stiffness of a material) is greater for the ethylene/styrene copolymer than the typical homogeneous ethylene 1-alkene copolymers, as illustrated in FIG. 1. For films, especially oriented films, this increase in amorphous phase stiffness due to the incorporation of styrene comonomer into the copolymer chain, results in a greater load or force bearing capacity by the film, as is illustrated in FIG. 1.

The present invention is directed to thermoplastic films which contain homogeneous single site catalyzed copolymers of an olefin having from two to eight carbon atoms per molecule and an vinyl aromatic. Generally, for purposes of the present invention the preferred olefin is ethylene. For those film embodiments which include one or more layers of a propylene homopolymer or a predominantly propylene copolymer, propylene/vinyl aromatic copolymers are preferred. The preferred vinyl aromatic comonomer is styrene, although other vinyl aromatics, such as substituted styrene, vinyl naphthalene, and vinyl anthracene can be used in the present invention.

As stated above, the term "copolymer" as used herein is intended to denote polymers of two or more comonomers. Thus, although the present description primarily focuses on olefin/vinyl aromatic copolymers, terpolymers are also within the scope of such term. Preferred terpolymers include copolymers of ethylene, octene and styrene, copolymers of ethylene, styrene and butene, and copolymers of ethylene, styrene and vinylbenzocyclobutane.

The thermoplastic films of the present invention are preferably formed by extrusion processes and, most preferably, by art-known coextrusion methods. Following coextrusion the film is cooled to a solid state by, for example, cascading water or chilled air quenching. For some structures a precursor film layer or layers may be formed by extrusion with additional layers thereafter being extrusion coated thereon to form multilayer films. Two multilayer tubes may also be formed with one of the tubes thereafter being coated or laminated onto the other.

The extrusion coating method of film formation is preferable to coextruding the entire film when it is desired to subject one or more layers of the film to a treatment which may be harmful to one or more of the other layers. That is, film production via extrusion coating is preferable to production via pure coextrusion, if it is desired to irradiate one or more layers of a film with high energy electrons (see the discussion of irradiation, as set forth below), without irradiating additional layers one or more of which comprises a barrier layer comprising one or more copolymers of vinylidene chloride (e.g., Saran (TM)), such as vinylidene chloride/vinyl chloride, vinylidene chloride-methyl acrylate, vinylidene chloride/ethyl acrylate or vinylidene chloride/acrylonitrile.

Films formed via extrusion coating would, for example, comprise those where the barrier layer is a vinylidene chloride copolymer layer in addition to or instead of an ethylene vinyl alcohol (EVOH) copolymer layer. Those skilled in the art generally recognize that irradiation with high energy electrons is generally harmful to such vinylidene chloride copolymer barrier layer compositions, as irradiation may degrade and discolor the vinylidene chloride copolymer, making it turn brown. Thus, if full coextrusion followed by high energy electron irradiation of the multilayer structure is carried out on a film having a vinylidene chloride copolymer barrier layer, the irradiation should be conducted at low levels. However, it is preferable to altogether avoid subjecting irradiation-sensitive polymers, such as vinylidene chloride copolymers , etc., to irradiation. This avoidance can be accomplished by using the extrusion coating method of multilayer film production, as described above.

As noted above, the present films may optionally be subjected to an energetic radiation treatment, including, but not limited to corona discharge, plasma, flame, ultraviolet, and high energy electron treatment. Irradiation with ultraviolet or high energy electron treatment may be carried out in such a manner as to produce a crosslinked polymer network. In this case, such irradiation is preferably performed prior to any orientation step and, in the case of an electron beam irradiated SARAN (TM)-containing barrier structure, prior to extrusion coating of the barrier component. Electronic radiation dosages are referred to herein in terms of the radiation unit "RAD," with one million RADs or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

For those embodiments in which the film is a multilayer film, each layer will generally serve some function or provide some characteristic to the overall structure. For example, the chemical composition and thickness of an outer layer intended can be selected so that the layer is suited for use as a sealing layer, i.e., suited to heat-sealing and/or RF (radio frequency) sealing, and, depending on the intended end use application for this outer layer, other factors such as grease-resistance may be of importance. The composition of the other outer layer of the film may be chosen for abuse resistance or, where a given end-use application requires a folded over "lap" seal, sealability to the seal layer. If an inner barrier layer is required, its particular chemical composition and thickness will be selected to provide a degree of gas or moisture impermeability needed for a specific packaging end use, i.e., a specific product to be packaged in the film. Further inner layers may serve to provide the film with added bulk, increased shrinkability, greater interlayer adhesion, increased elasticity, increased gas-permeability with respect to one or more specific gases, as well as any combination of these properties.

For purposes of the present invention, the olefin/vinyl aromatic copolymer, preferably ethylene/styrene copolymer, may be present in either a monolayer film or in one or more layers of a multilayer film structure. As such, the olefin/vinyl aromatic copolymer may comprise 100% of the layer in which it is present, or it may be present in a blend with another thermoplastic homopolymer or copolymer. For example, an olefin/vinyl aromatic copolymer such as an ethylene/styrene copolymer, when blended with at least one member selected from the group consisting of ethylene/alpha-olefin copolymer, ethylene/vinyl acetate copolymer, ethylene/alkyl acrylate copolymer, ethylene/acrylic acid copolymer, a metal neutralized salt of ethylene/acrylic acid copolymer, and low density polyethylene, will provide the film with a broader processing window for the orientation temperature, as well as higher free shrink. A broader processing window for the orientation temperature will also be achieved if an olefin/vinyl aromatic copolymer, is blended with an isotactic propylene/ethylene copolymer. If a heat-shrinkable structure is prepared using a blend of the olefin/vinyl aromatic copolymer with at least one member selected from the group consisting of ethylene/alpha-olefin, copolymer, ethylene/vinyl acetate copolymer, ethylene/alkyl acrylate copolymer, ethylene/acrylic acid copolymer, a metal neutralized salt of ethylene/acrylic acid copolymer, low density polyethylene, the present olefin/vinyl aromatic copolymer provides the resulting film with stretch memory properties similar to those of polyvinyl chloride. Plasticizer may also be blended with the alpha-olefin/vinyl aromatic copolymer used in film according to the present invention. Furthermore, if present in a blend with any of a wide range of thermoplastic homopolymers or copolymers, olefin/vinyl aromatic copolymer will improve the roughness the resultant film structure. If blended with atactic or syndiotactic polystyrene, impact resistance is improved and flex cracks (caused by brittleness) are reduced. If blended with ethylene or propylene homopolymers and/or copolymers, the olefin/vinyl aromatic copolymers improve clarity and increase gas and moisture vapor permeability of the overall film structure Olefin/vinyl aromatic copolymer may also be employed as a blending modifier in a seal layer, to enhance RF sealability or to enhance low-temperature seal initiation for heat sealing.

Furthermore, the olefin/vinyl aromatic copolymer, either alone in a monolayer film, and/or alone as a surface layer of a multilayer film, and/or as a component in a blend in either a mono- or multilayer film, may be employed to improve the printability of the film. Specifically, the present copolymers will improve printability over both known ethylene/alpha-olefin copolymers and styrene homopolymers. It is the dipole moment imparted by the aryl group of the olefin/vinyl aromatic copolymer which provides improved wettability and, therefore, improved printability if present in the external surface layer of a film.

It is this large dipole moment which also makes the present copolymers RF active, both as a component in a blend, as discussed above, and especially as the sole component of an RF sealing layer, or a susceptor layer. A "susceptor layer" is a layer within a multilayer structure which is either immediately adjacent to the sealing layer, or close enough to the sealing layer, so that in being heated by RF irradiation, the susceptor layer in turn heats the sealing layer to assist in the sealing process.

RF sealability is desired if olefin-based packaging materials are to compete with plasticized polyvinyl chloride (PVC) in the medical packaging arena. Although the downside risks of PVC are well known, such as the possibility of migration of the plasticizer (preferably, dioctyl phthalate) into a packaged medical solution, and reaction of the PVC itself with the packaged medical solution and, the fact that PVC becomes brittle at low temperatures, PVC has several specific performance characteristics which are required for the packaging for medical solutions and for other medical applications such as ostomy pouches and bags. That is, PVC provides the needed characteristics for end-use applications which require collapsibility, transparency, adequate mechanical strength, and the ability to resist the relatively high temperatures required for heat serialization. Olefin-based materials are being developed which can compete with PVC from a performance perspective, but many medical packaging convertors are still using RF sealing equipment.

Thus, olefin-based materials for use in the medical packaging industry often must be RF sealable. Such materials include the films used to make the pouches and fitments which are required to establish fluid communication between the container and the outside environment. In general, fitments are tubes, which can be monolayer or multilayer articles. In order to form the pouch, the outside outer layer of the fitment must seal to the inside outer layer of the film. Preferably, the inside outer layer of the film and the outside outer layer of the fitment are identical in chemical composition. Thus, if the inside outer layer of the film is RF active, the outside outer layer of the fitment is preferably composed of the same RF active polymer or blend. If the film has a sealing layer which is not RF active but relies on an interior susceptor layer, the fitment preferably has an outermost layer identical to the film's sealing layer and includes an interior susceptor layer as well.

Another application for olefin/vinyl aromatic copolymer is incorporation into a protective patch for use on a heat-shrinkable, thermoplastic bag used in the packaging of bone-in meat. The patch is preferably made by extruding a thermoplastic film comprising olefin/aromatic vinyl copolymer. This patch film can be a monolayer film having olefin/vinyl aromatic copolymer present alone or in a blend, or the patch film can be a multilayer film having olefin/vinyl aromatic copolymer in at least one layer, either along or in a blend. In the production of a multilayer patch film, a film tube is collapsed, irradiated, heated, inflated, and oriented, and is then collapsed again, and flattened such that the inside outer layer of the tube adheres to itself, i.e., is a self-adhering layer, thereby forming the multilayer patch film. Patches cut from the patch film are adhered to the outer surface of heat-shrinkable bags used in packaging bone-in cuts of meat, in order to protect the bag from being punctured by the bones. In the instance of a patch comprising a multilayer film, olefin/vinyl aromatic copolymer may be present in any layer of a multilayer patch, including the self-adhering layer, in order to improve the overall performance of the patch film, especially the impact resistance of the patch film.

According to the present invention, thermoformed trays, for example foam trays for holding meat, can comprise olefin/vinyl aromatic copolymer. Laminating a film onto foamed and unfoamed polystyrene is known, and is used to provide gas barrier properties to the trays, and/or to provide the trays with a surface for sealability to a lid and/or tray overwrap. However, delamination of the film from the polystyrene web produces unsightly blisters and other forms of product failure. In accordance with the present invention, olefin/vinyl aromatic copolymer, particularly ethylene/styrene copolymer, may be employed in an outer sealing layer of a multilayer film, this outer sealing layer to be adhered directly to a foamed tray. Alternatively, ethylene/styrene copolymers may be employed in an adhesive layer adjacent to a polystyrene bonding layer, in order to prevent delamination of the film.

The following examples are representative of the preferred embodiments of the present films containing homogeneous single site catalyzed olefin/vinyl aromatic copolymers.

EXAMPLE 1

Preparation of Ethylene/Styrene Copolymer, and Monolayer Film of Ethylene/Styrene Copolymer Approximately 1 gram of a polymer sample which was determined by GPC, nmr, and DSC analyses to be a blend of at least 90 weight percent of a high molecular weight, thermoplastic, homogeneous, random copolymer having about 80 mole percent ethylene/20 mole percent styrene (hereinafter "ES Copolymer #1), the balance being polyethylene homopolymer, was placed between separated, horizontally-positioned MYLAR (TM) sheets of a press assembly (comprising a Carver Laboratory Press and stainless steel supporting plates), the resin powder being placed in the center of a lower MYLAR (TM) sheet, which was positioned above a lower stainless steel plate. Thereafter, an upper MYLAR (TM) sheet was placed over and in contact with the powder, after which an upper stainless steel plate was placed over the upper MYLAR (TM) sheet, resulting in an assembly containing the resin powder. After placing this assembly in the press, the assembly was heated to 385° F. for 5 minutes without any substantial additional pressure being applied to the resin powder. After 5 minutes of this heating, 22,000 pounds of force was hydraulically applied to the resin by the press, this 22,000 pounds of force being maintained for 5 minutes, as the powder melted and was pressed into a film having a thickness of approximately 2 mils. Thereafter, this additional pressure was maintained for 5 additional (for a total of 10 minutes in the press), while the film was allowed to cool at a rate of about 15° C.±2° C./min, until a platen temperature of about 100° F. was obtained, after which the film was removed from the press, and was allowed to cool to ambient temperature.

This procedure was carried out in accordance with a general procedure for film formation in a laboratory press, as known to those of skill in the art, i.e., in accordance with ASTM D 1928 Procedure C, which is hereby incorporated by reference thereto, in its entirety.

The film was conditioned according to ASTM D 618-61 (hereby incorporated by reference thereto, in its entirety), for a period of about 45 hours, at 23° C. and 50% relative humidity.

The film prepared above was placed in a Rheometrics RSA-II Solids Analyzer. The thermomechanical spectra were obtained at 22 rad/sec (3.5 Hz) over the temperature range between −150° C. and 110° (nominal), by the procedures set forth in according to ASTM D 5026-89and ASTM 4065-90 (both of which are hereby incorporated by reference thereto, in their entireties), to generate the data provided in FIG. 1. Duplicate runs were made, with the resulting data sets being merged, and a two-point smoothing algorithm, supplied in the Rheometrics Rhios 4.2.2 data analysis software, was used to obtain an average spectrum.

EXAMPLE 2

Orientation of Monolayer Film of Example 1

The platen of Example 1 was oriented on a T. M. Long Stretcher laboratory orientation unit. The orientation conditions were as follows: air temperature=85° C.; dwell time=30 sec.; stretch ratio=4×4; strain rate: 1000 percent per second; plate temperature=85° C. The final oriented monolayer film was recovered from the orientation unit.

EXAMPLE 3

Hot Air Orientation of Multilayer Film Containing Propylene/Ethylene Copolymer and Ethylene/Styrene Copolymer A palindromic three-layer coextruded film having an A/B/A structure is oriented out of hot air at 115° C. The outer "A" layers are a propylene/ethylene copolymer having 3% by weight of ethylene. The inner "B" layer is an ethylene/styrene copolymer having 2% by mole of styrene (hereinafter "ES Copolymer #2"). The relative thickness of the A/B/A layers is 25 percent/50 percent/25 percent, respectively.

EXAMPLE 4

Hot Air Orientation of Multilayer Film Containing Propylene Homopolymer and Ethylene/Styrene Copolymer A palindromic three-layer coextruded film having an A/B/A structure is oriented out of hot air at 115° C. The outer "A" layers are a propylene homopolymer. The inner "B" layer is a propylene/styrene copolymer having 19% by mole of styrene (hereinafter PS Copolymer #3"). The relative thickness of the A/B/A layers is 25percent/50 percent/ 25 percent, respectively.

EXAMPLE 5

3-Layer Oriented Barrier Film Produced by Extrusion Coating

A two-layer coextruded precursor film is formed, the precursor film having the structure: outer layer #1/inner layer #1. Outer layer #1 is ELVAX3128 (TM) ethylene vinyl acetate resin, having 8.9% vinyl acetate (hereinafter, "EVA #1"), obtained from the DuPont de Nemours Corporation, of Wilmington, Del. Inner layer #1 is an ethylene/styrene copolymer having 4 mole percent styrene (hereinafter "ES Copolymer #4"). The precursor film is irradiated to 2 MR and thereafter extrusion-coated with a barrier layer of a vinylidene chloride/methyl acrylate copolymer (hereinafter "VDCMA Copolymer"), preferably SARAN (TM) VDCMA Copolymer obtained from the Dow Chemical Company, of Midland, Mich., followed by coating with an outer abuse layer known as LD 318.92 (TM) ethylene vinyl acetate having 9 percent vinyl acetate (hereinafter "EVA #2"), obtained from Exxon Chemical Company, of Baytown, Tex., to yield a resultant four layer film having the structure:

EVA #1/ES Copolymer #4//VDCMA Copolymer/EVA #2

The four layer film is then oriented out of hot water, via a trapped bubble method, with both the preheat and hot bath temperatures at 195° C.

EXAMPLE 6

5-Layered Oriented Barrier Film Produced by Extrusion Coating

A two-layer coextruded precursor film is formed, the precursor film having the structure: outer layer #1/inner layer #1. Outer layer #1 is EVA #1. Inner layer #1 is ES Copolymer #4. The precursor film is irradiated to 2 MR and thereafter extrusion-coated with a barrier layer of VDCMA Copolymer, followed by a layer of ES Copolymer #4, followed by an outer abuse layer of EVA #2, to yield a resultant four-layer film having the basic structure: EVA #1/ES Copolymer #4/VDCMA Copolymer/ES Copolymer #4/EVA #2

The five layer film is then oriented by a trapped bubble method out of hot water, with both the preheat and hot bath temperatures at 195° C.

EXAMPLE 7

6-Layer Oriented Barrier Film Produced by Extrusion Coating

A three-layer coextruded precursor film is formed, having the structure: outer layer #1/inner layer #1/inner layer #2. Outer layer #1 is EVA #1; inner layer #1 is ES Copolymer #4; inner layer #2 is Escorene LD-720.92 (TM) ethylene vinyl acetate copolymer having 19% vinyl acetate (hereinafter "EVA #3"), obtained from Exxon Chemical Company, of Baytown, Tex. The precursor film is irradiated to 2 MR and thereafter extrusion-coated with a layer of VDCMA Copolymer, followed by a layer of ES Copolymer #4, followed by a layer of EVA #2, to produce a six-layer film having the structure:

EVA #1/ES Copolymer #4/EVA #3//VDCMA/ES Copolymer #4/EVA #2

The six-layer film is then oriented by a trapped bubble method out of hot water, with both the preheat and hot bath temperatures at 195° C.

EXAMPLE 8

4-Layer Oriented Barrier Film Produced by Extrusion Coating

A two-layer coextruded precursor film is formed having an inner layer of an ethylene/styrene copolymer having 9 mole percent styrene (hereinafter "ES Copolymer #5"), and a second layer of EVA #3.

Following irradiation, the precursor film is extrusion-coated with a barrier layer of VDCMA, followed by a layer of EVA #2. Thereafter, the coated film is oriented out of hot water by a trapped bubble technique. The multilayer structure obtained is:

ES Copolymer #5/EVA #3//VDCMA/EVA #2

EXAMPLE 9

3-Layer Coextruded Oriented Film

A palindromic three-layer coextruded film having an A/B/A structure is oriented out of hot air at 115° C. The outer "A" layers are an ethylene/styrene copolymer having 6 mole percent styrene (hereinafter "ES Copolymer #6"). The inner "B" layer is PE 1335 (TM) ethylene vinyl acetate copolymer having 3.3% vinyl acetate (hereinafter "EVA #4"), obtained from Rexene, of Dallas, Tex. The relative thickness of the A/B/A layers is 25 percent/50 percent/25 percent, respectively.

EXAMPLE 10

3-Layered Coextruded Oriented Film Containing Core Layer Blend

A palindromic three-layer coextruded film having an A/B/A structure is oriented out of hot air at 115° C. The outer "A" layers are a blend of 50% ES Copolymer #6 and 50% of EVA #3. The inner "B" layer is an ethylene vinyl alcohol copolymer (hereinafter "EVOH Copolymer"). The relative thickness of the A/B/A layers if 25 percent/50percent/25 percent, respectively.

EXAMPLE 11

5-Layer Coextruded Oriented Film Containing Core Layer Blend

A palindromic five-layer coextruded film having an A/B/C/B/A structure is oriented out of hot air at 113° C. The outer layers are EVA #2. Inner "C" layer is EVOH Copolymer, and serves an a barrier to gaseous oxygen. Inner "B" layers are EVA #3, and serve as tie layers.

EXAMPLE 12

5-Layer Coextruded Oriented Film Containing EVOH Copolymer Barrier Layer

A palindromic five-layer coextruded film having an A/B/C/B/A structure is oriented out of hot air at 113° C. The outer "A" layers are ES Copolymer #2. The inner "C" layer is EVOH Copolymer. The inner "B" layers are EVA #3, and serve as tie layers.

EXAMPLE 13

7-Layer Coextruded Oriented Barrier Film Containing Nylon, Tie Layers, and Outer Ethylene Styrene Layers A palindromic seven-layer coextruded film having an A/B/C/D/C/B/A structure is oriented out of hot air at 113° C. The outer "A" layers are ES Copolymer #2. The inner "D" layer is EVOH copolymer. The inner "B" layers are EVA #3, and serve as tie layers. The inner "C" layers are nylon 6.

EXAMPLE 14

7-Layer Coextruded Oriented EVOH Barrier Film Containing Tie Layers and Only One ES Copolymer Outer Layer A seven-layer film is coextruded and quenched. The seven-layer film has a first outer layer of a heterogeneous ethylene/octene copolymer; followed by inner layer #1, of an ethylene vinyl acetate copolymer having 3.5% vinyl acetate (hereinafter "EVA #5"); followed by an inner layer #2, which serves as a tie layer and is of an anhydride-grafted polyolefin; followed by inner layer #3, of EVOH Copolymer; followed by inner layer #4, which serves as a tie layer and is of an anhydride grafted polyolefin; followed by inner layer #5, of EVA #5; followed by outer layer #2, of ES Copolymer #1.

EXAMPLE 15

Thermoformed Foam Sheet Having Film Laminated Thereto

The multilayer film of Example 14 is adhered to a foamed polystyrene web, using heat and pressure. Outer layer #2 bonds directly to the foamed polystyrene web. The foamed polystyrene with the seven-layer film laminated thereto is thereafter thermoformed into a tray.

EXAMPLE 16

5-Layer Coextruded and Quenched Film Containing EVOH Copolymer Barrier Layer

A five-layer multilayer film is coextruded and quenched. The multilayer film has a first layer of an ethylene vinyl acetate copolymer; followed by a second layer of a metal neutralized salt of an ethylene acrylic acid copolymer; followed by a third layer of an ethylene vinyl acetate copolymer; followed by a fourth layer of an ethylene styrene copolymer having 30% by mole of styrene (hereinafter ES Copolymer #7); followed by a fifth layer of polystyrene.

EXAMPLE 17

Thermoformed Metallized Web Having Film Laminated Thereto

The five-layer multilayer film of Example 16 is adhered to a metallized polyester web with an adhesive. The resultant laminate structure is thermoformed into a tray.

EXAMPLE 18

Eight-Layer Coextruded Film Thermoformed into Tray

An eight-layer film is coextruded as a multilayer film, followed by quenching. The eight-layer film has: a first layer of an ethylene vinyl acetate copolymer; a second layer of a metal neutralized salt of an ethylene acrylic acid copolymer; a third layer of an ethylene vinyl acetate copolymer; a fourth layer of an adhesive resin; a fifth layer of an ethylene vinyl alcohol copolymer; a sixth layer of an adhesive resin; a seventh layer of an ethylene styrene copolymer having 25% by mole of styrene; and, an eighth layer of polystyrene. The film is thermoformed into a tray.

EXAMPLE 19

Preparation of Patch and Bone-Guard Patch Bags

A two-layer film, in the form of a tube, is coextruded. The two-layer film has a first layer (the inside layer of the tube) of an ethylene vinyl acetate having 25% vinyl acetate, and a second layer (the outside layer of the tube) of a blend of 50 weight percent of an ethylene/styrene copolymer having 7% by mole of styrene, and 50 weight percent of an ethylene/vinyl acetate copolymer having 8% vinyl acetate. The tube is irradiated and then oriented out of hot air. Following orientation the tube is collapsed and flattened such that the first layer adheres to itself and the tube, thereby forming the tube into a four layer film. Thereafter the four-layer film is cut into patches which are adhered to a tube of film suitable for the preparation of bone-guard patch bags.

EXAMPLE 20

Preparation of Medical Pouch Using Multilayer Cast, Coextruded Four-Layer Film

A multilayer film is formed by downward cast coextrusion. The four-layer film has: a first layer of an ethylene propylene copolymer; a second layer which serves as an adhesive layer; a third layer of an ethylene styrene copolymer having 25% by mole of styrene; and, a fourth layer of an ethylene propylene copolymer. The four-layer film is converted into a pouch suitable for use in medical applications. During the conversion to the pouch structure, the film is RF sealed, with the fourth layer being a sealing layer and the third layer being a susceptor layer.

EXAMPLE 21

Preparation of Medical Pouch Using Multilayer Cast, Coextruded Five-Layer Film

A film is formed by downward cast coextrusion. The five-layer film has: a first layer of a copolyester; a second layer which serves as an adhesive layer; a third layer of heterogeneous ethylene octene copolymer having a density of 0.905 g/cc; a fourth layer which serves as an adhesive layer; a fifth layer of an ethylene/styrene copolymer having 30% by mole of styrene. During conversion of the film into a pouch for medical applications, the film is RF sealed.

EXAMPLE 22

Preparation of Medical Pouch Using Coextruded Four-Layer Film Containing Susceptor Layer A multilayer film is formed using a downward cast coextrusion process. The four-layer film has: a first layer of a copolyester; followed by a second layer which serves as an adhesive layer; followed by a third layer, which is a blend of 50%, of an ethylene/vinyl acetate copolymer and 50% of an ethylene/styrene copolymer having 35% by mole of styrene; and a fourth layer of a modified ethylene/propylene copolymer. During conversion of the film into a pouch for medical application the third layer acts as an RF susceptor layer.

The foregoing description of preferred embodiments of the invention has been presented for purposes of illustration and description. It is not intended to be exhaustive or to limit the invention to the precise form disclosed, and modifications and variations of the invention are possible in light of the above teachings. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multilayer film, comprising:

(A) a first outer layer comprising a first polypropylene;

(B) an inner layer between the first outer layer and the second outer layer, the inner layer comprising a composition comprising a thermoplastic, homogeneous alpha-olefin/vinyl aromatic copolymer comprising:

(i) recurring units of the formula:

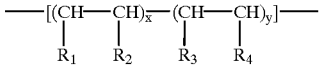

wherein:

$x \geqq y$;

$R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof: $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected from the group consisting of hydrogen, aromatic, [or] *and* mixtures thereof; $R_4$ is a member selected from the group consisting of hydrogen, aromatic,[or] *and* mixtures thereof; provided that one, and only one, member selected from the group consisting of $R_3$ and $R_4$, is aromatic; and (ii) provided that a copolymer portion between every two adjacent members selected from the group consisting of aromatic $CHR_3$ and aromatic $CHR_4$ comprises at least two —$CH_2$—; and (C) A second outer layer comprising a second polypropylene.

2. The multilayer film according to claim 1, wherein the multilayer film has a substantially symmetrical structure.

3. The multilayer film according to claim 1, wherein the film is heat-shrinkable.

4. The multilayer film according to claim 1, wherein $R_1$ is H and $R_2$ is H.

5. The multilayer film according to claim 1, wherein in

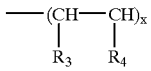

a first member, selected from the group consisting of $R_3$ and $R_4$, is H; and a second member, selected from the group consisting of $R_3$ and $R_4$, is $C_6H_5$.

6. The multilayer film according to claim 5, wherein in

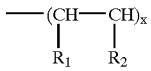

a first member, selected from the group consisting of $R_1$ and $R_2$, is H; and a second member, selected from the group consisting of $R_1$ and $R_2$, is $CH_3$.

7. The multilayer film according to claim 6, wherein the first polypropylene comprises from about 99 to 90 mole percent propylene polymerization units, and from about 1 to 10 weight percent ethylene polymerization units; and the second propylene comprises from about 99 to 90 mole percent propylene polymerization units, and from about 1 to 10 weight percent ethylene polymerization units.

8. A multilayer film comprising:

(A) a first layer, the first layer being an outer layer, the first layer being a heat sealing layer;

(B) a second layer, the second layer being an inner layer, the second layer comprising a composition comprising a thermoplastic, homogeneous copolymer of an alpha-olefin and a vinyl aromatic, wherein the copolymer comprises:

(i) recurring units of the formula:

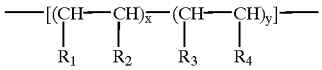

wherein:

x≧y;

$R_1$is a member selected from the group consisting of hydrogen, $C_1$ alkyl, $C_2$ alkyl, $C_3$ alkyl, $C_4$ alkyl, $C_5$ alkyl, $C_6$alkyl, [or] *and* mixtures thereof; $R_2$ is a member selected from the group consisting of hydrogen, $C_1$ alkyl, $C_2$alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (ii) provided that a copolymer portion between every two adjacent members selected from the group consisting or aromatic $CHR_3$ and aromatic $CHR_4$ comprises at least two —$CH_2$—; and (C) a third layer, the third layer being an inner layer, the third layer being a barrier to gaseous oxygen; and (D) a fourth layer, the fourth layer being an outer layer.

9. The multilayer film according to claim 8, wherein the multilayer film is heat-shrinkable.

10. The multilayer film according to claim 8, wherein the third layer comprises a vinylidene chloride copolymer.

11. The multilayer film according to claim 8, wherein R1 is H and $R_2$ is H.

12. The multilayer film according to claim 11, wherein x represents at least about 75 mole percent, based on a total of x and y.

13. The multilayer film according to claim 8, wherein in

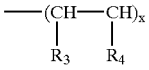

a first member, selected from the group consisting of $R_3$ and $R_4$, is H; and a second member selected from the group consisting of $R_3$ and $R_4$, is $C_6H_5$.

14. The multilayer film according to claim 8, wherein the first layer comprises a copolymer comprising (a) ethylene polymerization units; and (b) polymerization units from a monomer comprising at least one member selected from the group consisting of alpha-olefin, vinyl acetate, alkyl acrylate, acrylic acid, and a metal neutralized salt of an acrylic acid.

15. The multilayer film according to claim 8, further comprising:

(E) a fifth layer, the fifth layer being an inner layer, the fifth layer being between the third layer and the fourth layer, the fifth layer comprising a composition comprising a second thermoplastic, homogeneous alpha-olefin/vinyl aromatic copolymer, wherein the second copolymer comprises:

(i) recurring units of the formula:

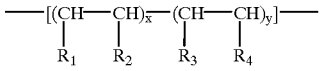

wherein:

x≧y:

$R_1$ is a member selected from the group consisting of hydrogen, $C_1$ alkyl, $C_2$ alkyl, $C_3$ alkyl, $C_4$alkyl, $C_5$ alkyl, $C_6$ alkyl, [or] *and* mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof, provided that $R_1$ and $R_2$ cannot both be alkyl;

$R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (ii) provided that a second copolymer portion between every two adjacent members selected from the group consisting of aromatic $CHR_3$ and aromatic $CHR_4$ comprises at least two —$CH_2$—.

16. The multilayer film according to claim 8, wherein the fourth layer is an abuse layer.

17. The multilayer film according to claim 9, further comprising a tie layer.

18. A multilayer film, comprising a composition comprising:

(A) a first layer, the first layer being a gaseous oxygen barrier layer; and (B) a second layer, the second layer being a heat sealing layer, the second layer comprising [a composition] a thermoplastic, homogeneous *alpha-olefin/vinyl aromatic* copolymer [of an alpha-olefin and a vinyl aromatic], wherein the copolymer comprises:

(i) recurring units of the formula:

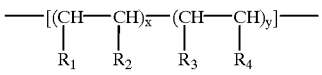

wherein:

$x \geqq y$;

$R_1$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; $R_2$ is a member selected from the group consisting of hydrogen, $C_1$ alkyl, $Cl_2$ alkyl, $C_3$ alkyl, $C_4$ alkyl, $Cl_5$ alkyl, $C_6$ alkyl, [or] *and* mixtures thereof; provided that $R_1$ and $R_2$ cannot both be alkyl;

$R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (ii) provided that a copolymer portion between every two adjacent members selected from the group consisting of aromatic $CHR_3$ and aromatic $CHR_4$ comprises at least two —$CH_2$—.

19. The multilayer film according to claim 18, wherein the multilayer film is heat-shrinkable.

20. The multilayer film according to claim 18, wherein R1 is H and $R_2$ is H.

21. The multilayer film according to claim 20, wherein x represents at least about 75 mole percent, based on a total of x and y.

22. The multilayer film according to claim 18, wherein in

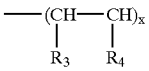

a first member, selected from the group consisting of $R_3$ and $R_4$, is H; and a second member, selected from the group consisting of $R_3$ and $R_4$, is $C_6H_5$.

23. The multilayer film according to claim 18, wherein the first layer comprises vinylidene chloride copolymer.

24. The multilayer film according to claim 18, further comprising an outer abuse layer.

25. The multilayer film according to claim 18, further comprising a tie layer.

26. A multilayer film, comprising:

(A) a first layer, the first layer being an outer layer[, the first layer comprising a composition] comprising a first *thermoplastic, homogeneous* alpha-olefin/vinyl aromatic copolymer, wherein the copolymer comprises:

(i) recurring units of the formula:

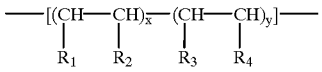

wherein:

$x \geqq y$;

$R^1$ is a member selected from the group consisting of hydrogen, $C_1$ alkyl, $C_2$alkyl, $C_3$ alkyl, $C_4$ alkyl, $C_5$ alkyl, $C_6$ alkyl, [or] *and* mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected form the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (ii) provided that a second copolymer portion between every two adjacent members selected from the group consisting of aromatic $CHR_3$ and aromatic $CHR_4$ comprises at least two —$CH_2$—:

(B) a second layer, the second layer being an inner layer; and (C) a third layer, the third layer being an outer layer[, the third layer] comprising a second thermoplastic, homogeneous alpha-olefin/vinyl aromatic polymer, wherein the copolymer comprises:

(i) recurring units of the formula:

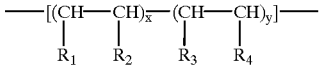

wherein:

$x \geqq y$;

$R_1$ is a member selected from the group consisting of hydrogen, $C_1$ alkyl, $C_2$ alkyl, $C_3$ alkyl, $C_4$ alkyl $C_5$ alkyl, $C_6$ alkyl, [or] *and* mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, number selected from the group consisting of $R_3$ and $R_4$, is aromatic; and (ii) provided that a second copolymer portion between every two adjacent members selected from the group consisting of aromatic $CHR_3$ and aromatic $CHR_4$ comprises at least two —$CH_2$—.

27. The multilayer film according to claim 26, wherein the multilayer film has a substantially symmetrical structure.

28. The multilayer film according claim 26, wherein the multilayer film is heat-shrinkable.

29. The multilayer film according to claim [21] *26*

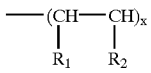

wherein $R_1$ is H and $R_2$ is H.

30. The multilayer film according to claim 29, wherein each of the first thermoplastic homogeneous alpha-olefin/vinyl aromatic copolymer and the second thermoplastic homogeneous alpha-olefin/vinyl aromatic copolymer[,] *comprise* at least 75 mole percent of:

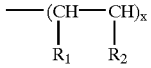

have $R_1$ being H and $R_2$ being H.

31. The multilayer film according to claim 26, wherein both the first thermoplastic homogeneous alpha-olefin/vinyl aromatic copolymer and the second thermoplastic homogeneous alpha-olefin/vinyl aromatic copolymer comprise:

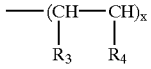

a first member, selected from the group consisting of $R_3$ and $R_4$, is H; and a second member, selected from the group consisting of $R_3$ and $R_4$, is $C_6H_5$.

32. The multilayer film according to claim 26, wherein the second layer comprises a copolymer comprising:

(a) ethylene polymerization units; and (b) polymerization units from a monomer comprising at least one member selected from the group consisting of alpha-olefin, vinyl acetate, alkyl acrylate, acrylic acid, and a metal neutralized salt of an acrylic acid.

33. The heat-shrinkable film according to claim 26, wherein the second layer comprises polypropylene.

34. The multilayer film according to claim 26, wherein the second layer is a gaseous oxygen barrier.

35. The multilayer film according to claim 34, wherein the second layer comprises ethylene/vinyl alcohol copolymer.

36. The multilayer film according to claim 26, further comprising:

a fourth layer directly adhered to the second layer, the fourth layer being between the first layer and the second layer;

a fifth layer directly adhered to the second layer, the fifth layer being between the second layer and the third layer.

37. The multilayer film according to claim 36, wherein the fourth layer comprises polyamide, and the fifth layer comprises polyamide.

38. The multilayer film according to claim 37, further comprising:

a sixth layer between the first layer and the fourth layer, the sixth layer being a tie layer; and a seventh layer between the third layer and the fifth layer, the seventh layer being a tie layer.

39. The multilayer film according to claim 26, wherein the first layer comprises at least two thermoplastic polymers, and the third layer comprises at least two thermoplastic polymers.

40. A multilayer thermoformable article, comprising:

(A) a first layer comprising a polystyrene web; and (B) a second layer comprising a multilayer, heat-resistant film comprising a composition comprising a thermoplastic, homogeneous alpha-olefin/vinyl aromatic *copolymer*, wherein the copolymer comprises:

(i) recurring units of the formula:

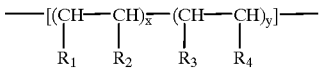

wherein:

$X \geqq y$;

$R_1$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (ii) provided that a copolymer portion between every two adjacent members selected from the group consisting of aromatic $CHR_3$ and aromatic $CHR_4$ comprises at least two —$CH_2$—.

41. A multilayer article comprising a heat-shrinkable patch member on a thermoplastic bag, the heat shrinkable patch member comprising a composition comprising [an] *a thermoplastic homogeneous* alpha-olefin/vinyl aromatic copolymer comprising:

(A) recurring units of the formula:

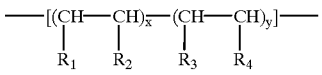

wherein:

$x \geqq y$;

$R_1$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; $R_2$ is a member selected from the group consisting of hydrogen, $C_1$ alkyl, $C_2$ alkyl, $C_3$ alkyl, $C_4$ alkyl, $C_5$ alkyl, $C_6$ alkyl, [or] *and* mixtures thereof; provided that $R_1$ and $R_2$ cannot both be alkyl; and $R_3$ is a member selected from the group consisting of hydrogen, aromatic, [or] *and* mixtures thereof; $R_4$ is a member selected from the group consisting of hydrogen, aromatic, [or] *and* mixtures thereof; provided that one, and only one, member selected from the group consisting of $R_3$ and $R_4$, is aromatic; and (B) provided that a copolymer portion between every two adjacent members selected from the group consisting of aromatic $CHR_3$ and aromatic $CHR_4$ comprises at least two —$CH_2$—.

*42. The multilayer film according to claim 1, wherein the vinyl aromatic is present from about 2 mol % to 50 mol % in the copolymer.*

*43. The multilayer film according to claim 42, wherein the vinyl aromatic is present from about 25 mol % to 50 mol % in the copolymer.*

*44. The multilayer film according to claim 43, wherein the vinyl aromatic is present from about 25 mol % to 40 mol % in the copolymer.*

*45. The multilayer film according to claim 43, wherein the vinyl aromatic is present from about 35 mol % to 50 mol % in the copolymer.*

*46. The multilayer film according to claim 42, wherein the alpha-olefin is ethylene and the vinyl aromatic is styrene.*

*47. The multilayer film according to claim 8, wherein the vinyl aromatic is present from about 2 mol % to 50 mol % in the copolymer.*

*48. The multilayer film according to claim 47, wherein the vinyl aromatic is present from about 25 mol % to 50 mol % in the copolymer.*

*49. The multilayer film according to claim 48, wherein the vinyl aromatic is present from about 25 mol % to 40 mol % in the copolymer.*

*50. The multilayer film according to claim 48, wherein the vinyl aromatic is present from about 35 mol % to 50 mol % in the copolymer.*

*51. The multilayer film according to claim 47, wherein the alpha-olefin is ethylene and the vinyl aromatic is styrene.*

*52. The multilayer film according to claim 18, wherein the vinyl aromatic is present from about 2 mol % to 50 mol % in the copolymer.*

*53. The multilayer film according to claim 52, wherein the vinyl aromatic is present from about 25 mol % to 50 mol % in the copolymer.*

*54. The multilayer film according to claim 53, wherein the vinyl aromatic is present from about 25 mol % to 40 mol % in the copolymer.*

*55. The multilayer film according to claim 53 wherein the vinyl aromatic is present from about 35 mol % to 50 mol % in the copolymer.*

*56. The multilayer film according to claim 52, wherein the alpha-olefin is ethylene and the vinyl aromatic is styrene.*

*57. The multilayer film according to claim 26, wherein the vinyl aromatic is present from about 2 mol % to 50 mol % in the copolymer.*

*58. The multilayer film according to claim 57, wherein the vinyl aromatic is present from about 25 mol % to 50 mol % in the copolymer.*

*59. The multilayer film according to claim 58, wherein the vinyl aromatic is present from about 25 mol % to 40 mol % in the copolymer.*

*60. The multilayer film according to claim 58, wherein the vinyl aromatic is present from about 35 mol % to 50 mol % in the copolymer.*

*61. The multilayer film according to claim 57, wherein the alpha-olefin is ethylene and the vinyl aromatic is styrene.*

*62. The multilayer thermoformable article according to claim 40, wherein the vinyl aromatic is present from about 2 mol % to 50 mol % in the copolymer.*

*63. The multilayer thermoformable article according to claim 62, wherein the vinyl aromatic is present from about 25 mol % to 50 mol % in the copolymer.*

*64. The multilayer thermoformable article according to claim 63, wherein the vinyl aromatic is present from about 25 mol % to 40 mol % in the copolymer.*

*65. The multilayer thermoformable article according to claim 63, wherein the vinyl aromatic is present from about 35 mol % to 50 mol % in the copolymer.*

*66. The multilayer thermoformable article according to claim 58, wherein the alpha-olefin is ethylene and the vinyl aromatic is styrene.*

*67. The multilayer thermoformable article according to claim 40, wherein the first layer is a foamed polystyrene web.*

*68. The multilayer thermoformable article according to claim 62, wherein the first layer is a foamed polystyrene web.*

*69. The multilayer article according to claim 41, wherein the vinyl aromatic is present from about 2 mol % to 50 mol % in the copolymer.*

*70. The multilayer article according to claim 69, wherein the vinyl aromatic is present from about 25 mol % to 50 mol % in the copolymer.*

*71. The multilayer article according to claim 70, wherein the vinyl aromatic is present from about 25 mol % to 40 mol % in the copolymer.*

*72. The multilayer article according to claim 70, wherein the vinyl aromatic is present from about 35 mol % to 50 mol % in the copolymer.*

*73. The multilayer article according to claim 69, wherein the alpha-olefin is ethylene and the vinyl aromatic is styrene.*

* * * * *